US007167799B1

(12) United States Patent
Dolgov et al.

(10) Patent No.: US 7,167,799 B1
(45) Date of Patent: Jan. 23, 2007

(54) SYSTEM AND METHOD OF COLLISION AVOIDANCE USING INTELLIGENT NAVIGATION

(75) Inventors: Dmitri A. Dolgov, Ann Arbor, MI (US); Kenneth P. Laberteaux, Ann Arbor, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 11/387,414

(22) Filed: Mar. 23, 2006

(51) Int. Cl.
*G01C 23/00* (2006.01)
*G06F 19/00* (2006.01)

(52) U.S. Cl. .................................... 701/301; 701/213

(58) Field of Classification Search .................. 701/36, 701/208, 211, 213, 216, 220, 300, 301; 342/357.06, 342/357.09, 357.14, 455
See application file for complete search history.

(56) References Cited

U.S. PATENT DOCUMENTS

| | | | | |
|---|---|---|---|---|
| 6,370,475 | B1 * | 4/2002 | Breed et al. | 701/301 |
| 6,405,132 | B1 * | 6/2002 | Breed et al. | 701/301 |
| 6,480,789 | B1 * | 11/2002 | Lin | 701/301 |
| 6,516,273 | B1 * | 2/2003 | Pierowicz et al. | 701/301 |
| 6,624,782 | B1 * | 9/2003 | Jocoy et al. | 342/70 |
| 6,675,095 | B1 * | 1/2004 | Bird et al. | 701/301 |
| 6,748,325 | B1 * | 6/2004 | Fujisaki | 701/301 |
| 6,768,944 | B1 * | 7/2004 | Breed et al. | 701/301 |

OTHER PUBLICATIONS

Dmitri Dolgov and Edmund Durfee, "Symmetric Primal-Dual Approximate Linear Programming for Factored MDP's" Department of Electrical Engineering and Computer Science, University of Michigan.

Dmitri Dolgov and Edmund Durfee, Graphical Models in Local, Asymmetric Multi-Agent Markov Decision Processes, Department of Electrical Engineering and Computer Science.

(Continued)

*Primary Examiner*—Richard M. Camby
(74) *Attorney, Agent, or Firm*—Gifford, Krass, Groh, Sprinkle, Anderson & Citkowski, P.C.

(57) ABSTRACT

A system and method of intelligent navigation with collision avoidance for a vehicle is provided. The system includes a global positioning system and a vehicle navigation means in communication with the global positioning system. The system also includes a centrally located processor in communication with the navigation means, and an information database associated with the controller, for identifying a location of a first vehicle and a second vehicle. The system further includes an alert means for transmitting an alert message to the vehicle operator regarding a collision with a second vehicle. The method includes the steps of determining a geographic location of a first vehicle and a second vehicle within an environment using the global positioning system on the first vehicle and the global positioning system on the second vehicle, and modeling a collision avoidance domain of the environment of the first vehicle as a discrete state space Markov Decision Process. The methodology scales down the model of the collision avoidance domain, and determines an optimal value function and control policy that solves the scaled down collision avoidance domain. The methodology extracts a basis function from the optimal value function, scales up the extracted basis function to represent the unscaled domain, and determines an approximate solution to the control policy by solving the rescaled domain using the scaled up basis function. The methodology further uses the solution to determine if the second vehicle may collide with the first vehicle and transmits a message to the user notification device.

17 Claims, 5 Drawing Sheets

OTHER PUBLICATIONS

Dmitri Dolgov and Ken Laberteaux, "Efficient Linear Approximations to Stochastic Vehicular Collision-Avoidance Problems"Toyota Technical Center USA, Inc., The Second International Conference on Informatics in Control, Automoation and Robotics.

Carlos Guestrin et al. "Efficient Solution Algorithms for Factored MDP"" Journal of Artificial Intelligence Research 19 (2003) pp. 399-468.

D.P. De Farias, B. Van Roy, "The Linear Programming Approach to Approximate Dynamic Programming", Operations Research, 2003, vol. 51, No. 6, Nov.-Dec. 2003, pp. 850-865.

* cited by examiner

SYSTEM AND METHOD OF COLLISION AVOIDANCE USING INTELLIGENT NAVIGATION

BACKGROUND OF THE INVENTION

1. Field of the Invention

The present invention relates generally to an intelligent navigation system for a vehicle, and more specifically, to a system and method of providing collision avoidance information using an intelligent navigation system.

2. Description of the Related Art

Intelligent navigation involves the delivery of information to a vehicle operator. Various types of information are useful for navigation purposes, such as vehicle position, maps, road conditions, or the like. The information is communicated to the vehicle operator in a variety of ways, such as a display device or a screen integral with the instrument panel, or through an auditory output device.

One feature of an intelligent navigation system is the integration of a global positioning system (GPS) to automatically determine the location of the vehicle. The GPS may be a handheld device or integral with the vehicle. The global positioning system includes a signal transmitter, a signal receiver, and a signal processor. The GPS, as is known in the art, utilizes the concept of time-of-arrival ranging to determine position. The global positioning system includes a signal receiver in communication with a space satellite transmitting a ranging signal. The position of the signal receiver can be determined by measuring the time it takes for a signal transmitted by the satellite at a known location to reach the signal receiver in an unknown location. By measuring the propagation time of signals transmitted from multiple satellites at known locations, the position of the signal receiver can be determined. NAVSTAR GPS is an example of a GPS that provides worldwide three-dimensional position and velocity information to users with a receiving device from twenty-four satellites circling the earth twice a day.

Another feature of a navigation system is a digital map. The digital map is an electronic map stored in an associated computer database. The digital map may include relevant information about the physical environment, such as roads, intersections, curves, hills, traffic signals, or the like. The digital map can be extremely useful to the vehicle operator. The computer database may be in communication with another database in order to update the information contained in the map.

Vehicles are also a part of the physical environment. The relative position of a particular vehicle in the physical environment is dynamic, thus making it difficult to track the exact location of the vehicle. At the same time, knowing the relative position of another vehicle is beneficial to the vehicle driver, and may assist the vehicle driver in avoiding the occurrence of a collision with another vehicle. Thus, there is a need in the art for an intelligent navigation system that incorporates collision avoidance in order to provide the operator with additional information about the physical environment in which it operates.

SUMMARY OF THE INVENTION

Accordingly, the present invention is a system and method of intelligent navigation with collision avoidance for a vehicle. The system includes a global positioning system and vehicle navigation means in communication with the global positioning system. The system also includes a centrally located processor in communication with the navigation means, and an information database associated with the controller that includes a map for identifying a location of a first vehicle and a second vehicle. The system further includes an alert means for transmitting an alert message to the vehicle operator regarding a collision with a second vehicle. The method includes the steps of determining a geographic location of a first vehicle and a second vehicle within an environment using the navigation system, and modeling a collision avoidance domain of the environment of the first vehicle as a discrete state space Markov Decision Process. The methodology scales down the model of the collision avoidance domain, and determines an optimal value function and control policy that solves the scaled down collision avoidance domain. The methodology extracts a basis function from the optimal value function, scales up the basis function to represent the unscaled domain, and determines an approximate solution to the control policy by solving the rescaled domain using the scaled up basis function. The methodology further uses the solution to determine if the second vehicle may collide with the first vehicle and transmits a message to the user notification device.

One advantage of the present invention is that an intelligent navigation system that incorporates collision avoidance is provided that alerts the vehicle operator to the position of other objects, such as a vehicle, in the environment, to avoid a potential collision. Another advantage of the present invention is that a system and method of intelligent navigation that incorporates collision avoidance is provided that is cost effective to implement. Still another advantage of the present invention is that a system and method of intelligent navigation that incorporates collision avoidance is provided that models the multiple vehicles within the environment as a sequential stochastic control problem. A further advantage of the present invention is that a system and method of intelligent navigation system that incorporates collision avoidance is provided that utilizes a factored Markov Decision Process to represent the environment and applies an approximate linear programming to approximate a solution.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
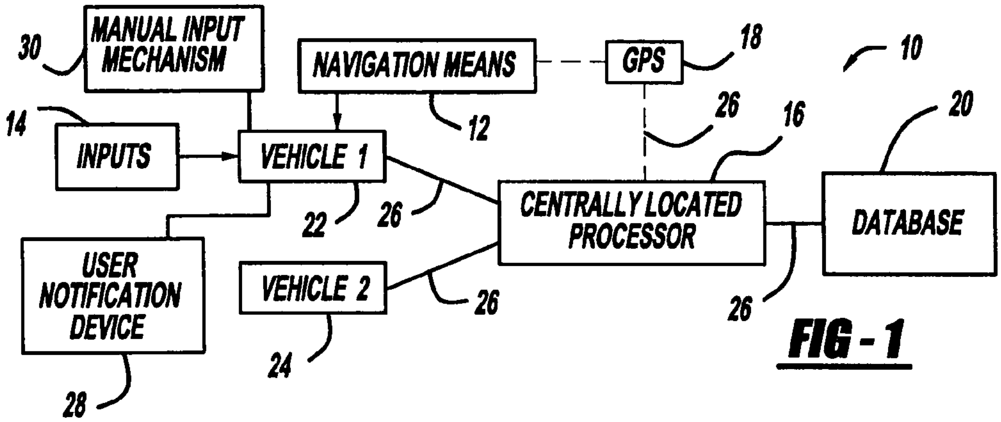
FIG. 1 is a block diagram of an intelligent navigation system with a collision avoidance feature, according to the present invention.

Referring to FIG. 1, a system 10 of intelligent navigation using collision avoidance is provided. In this example, the system 10 is integrated into an automotive vehicle 22, although it is contemplated that it can be utilized on other types of vehicles, such as boats or planes or trains. Further, it is anticipated that part of the system 10 may be incorporated into a handheld device. Various uses of the system 10 are foreseeable beyond providing an indication of a location of one automotive vehicle 22 with respect to another automotive vehicle 24. For example, it can be utilized on a boat to warn of the presence of another boat.

The system includes a navigation means 12. The navigation means 12 is usually located on board the vehicle 22. The navigation means 12 receives various vehicle-related inputs, processes the inputs and utilizes the information for navigation purposes. In this example the navigation purpose is collision avoidance.

The vehicle inputs 14 may be utilized in conjunction with the map data in an information database 20 to determine the position of the second vehicle 24 within the physical environment and provide this information to the driver. The position of the second vehicle 24 is transmitted to a centrally located processor 16 (to be described) and the processor 16 uses the information in various ways, such as to determine the distance between the vehicles. It should be appreciated that the second vehicle 24 may represent one or more vehicles. Also, the second vehicle may include a navigation means, and inputs as described with respect to the first vehicle.

One example of an input signal is vehicle speed. This can be measured by a speed sensor operatively in communication with a processor on board the vehicle. Another example of an input signal is vehicle yaw rate. This can be measured using a sensor associated with the vehicle brake system. Other relevant inputs may also be sensed, such as using a light sensor, a time sensor, or a temperature sensor. Still another example of an input is actual vehicle geographic location. This information can be obtained from a compass. Actual vehicle location can also be obtained using a visual recording device, such as a camera.

The actual geographic vehicle location may be provided by a global positioning system 18, or GPS. In this example, the GPS includes a global positioning transceiver in communication with the navigation means 12 that is also in communication with a GPS signal transmitter. The GPS signal transmitter is a satellite-based radio navigation system that provides global positioning and velocity determination. The GPS signal transmitter includes a plurality of satellites strategically located in space that transmit a radio signal. The GPS transceiver uses the signals from the satellites to calculate the location of the vehicle. The GPS transceiver may be integral with the navigation system on board the vehicle or separable.

The centrally located processor 16 receives information from and transmits information to the vehicles 22, 24. The centrally located processor 16 analyzes the information received from the vehicles 22, 24 in order to determine each vehicle's location. The centrally located processor 16 is operatively in communication with the vehicle navigation means 12 via a communications link 26. The communications link 26 may be a wired connection, or wireless, for purposes of information transfer. One example of a wireless link is a universal shortwave connectivity protocol referred to in the art as BLUETOOTH. Another example of a communications link 26 is the internet.

The system 10 also includes an automated collision detection and notification algorithm (to be described). The algorithm may be stored in a memory associated with the centrally located processor, or a separate controller on board the vehicles 22, 24. The memory may be a permanent memory, or a removable memory module. An example of a removable memory is a memory stick or smart card, or the like. An advantage of a removable memory is that the information learned by the system and stored on the memory module may be transferred to another vehicle. Advantageously, the removable memory accelerates the learning process for the new vehicle.

The information database 20 is preferably maintained by the centrally located processor 16. The information database 20 contains relevant data, such as geographically related information. In this example, the information database 20 is a map database. In addition to the previously described map features, the map may contain information specific to a particular location or topological information such as curves in the road or hills. The map may also identify the location of traffic control devices. Various types of traffic control devices or traffic signals are commonly known. These include stop signs, yield signs, traffic lights, warning devices, or the like.

The system 10 further includes a user notification device 28 operatively in communication with the navigation means 12 via the communication link 26. One example of a user notification device 28 is a display screen. The display screen displays information relevant to the system and method. For example, the display screen displays a warning message relating to collision notification, so that the driver can take the appropriate corrective action. Another example of a user notification device 28 is an audio transmission device that plays an audio message through speakers associated with an audio transceiver on the vehicle, such as the radio.

The system 10 also includes a user manual input mechanism 30 which is operatively in communication with the centrally located processor 16 via the communication link 26. The manual user input mechanism 30 can be a keypad or a touchpad sensor on the display screen, or a voice-activated input or the like. The manual user input mechanism 30 allows the user to provide a manual input to the processor 16. The user input may be independent, or in response to a prompt on the display device.

It should be appreciated that the vehicles may include other components or features that are known in the art for such vehicles.

Figure 2:
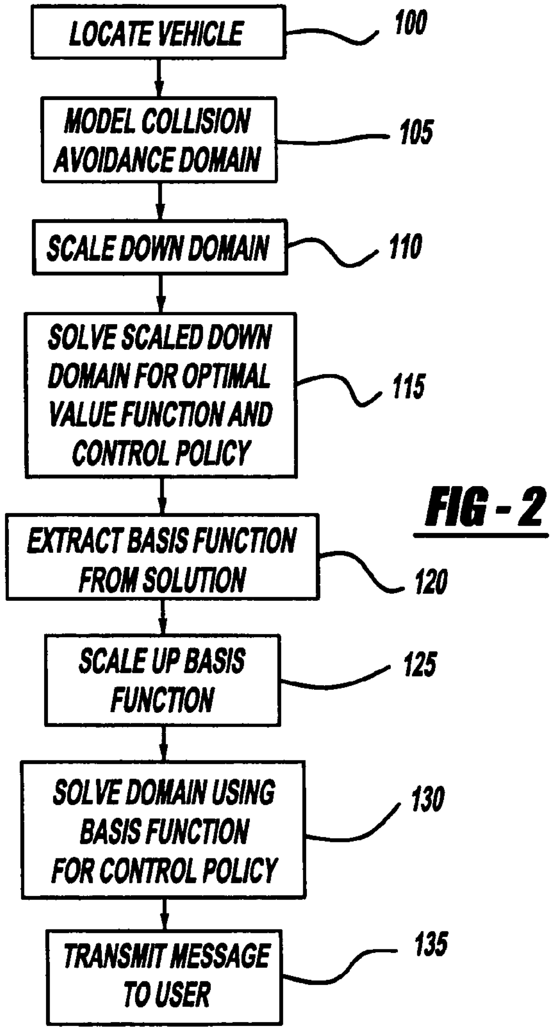
FIG. 2 is a flowchart of a method of intelligent navigation with a collision avoidance feature using the system of FIG. 1, according to the present invention.

Referring to FIG. 2, a method of intelligent navigation with collision avoidance using the system 10 described with respect to FIG. 1 is illustrated.

The methodology begins in block 100 by determining the geographic location of the first vehicle 22, as well as other vehicles 24 in the environment. For example, the GPS system 18 on the vehicles 22, 24 provides information to the centrally located processor 16 regarding the location of the vehicles 22, 24. The processor 16 then utilizes the sensed location of the vehicles 22, 24 to identify the position of the vehicles 22, 24 using a map maintained by the information database 20 associated with the centrally located processor 16. The geographic coordinates of the sensed vehicle position may be compared to geographic coordinates on the map in order to identify the location. It should be appreciated that the geographic location of the first vehicle represents the environment.

The method continues in block 105 with the step of using the environment 32 of the first vehicle 22 to model the collision avoidance domain as a discrete state space that includes all features of the environment 32. In this example, the collision avoidance domain is two-dimensional. The domain is modeled as a discrete space Markov Decision Process (MDP). It should be appreciated that the model can be computed off-line.

Figure 3:
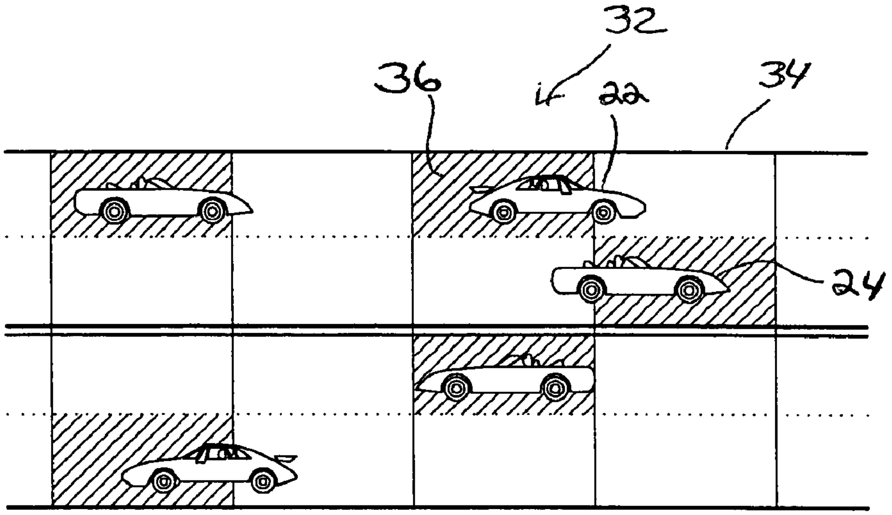
FIG. 3 is a model of the state space as a discretized grid, according to the present invention.

Referring to FIG. 3, in order to model the environment 32 as a discrete space, a grid 34 may be superimposed on a map of the environment 32. Features within the domain are identified, such as the location of vehicles 22, 24 in the domain. For example, the x-y coordinates of an occupied cell 36 in the grid 34 represent the position of a particular vehicle in the domain. It should be appreciated that the grid 34 does not have to be regular, that is not all cells have to be of the same size and shape. Another domain feature includes vehicle speed, road conditions, or the like. These features are discretized in a similar manner. It should be appreciated that the number of states in the environment grows exponentially with the number of domain features. As a result, the environment quickly becomes too complex to calculate an exact solution. For example, the domain of FIG. 3 illustrates five vehicles on a 4×10 grid, which results in a MDP with over four billion states. Approximation techniques are advantageously utilized to derive a solution.

The MDP model of the domain includes a decision maker, referred to as an agent, that operates in the stochastic environment in a discrete time setting. At every time step, the agent executes an action that stochastically controls the future of the model. The agent may receive feedback from the environment, also referred to as a reward. The agent establishes a control policy, or decision rule, for selecting actions that maximize a measure of an aggregate reward that it receives from the model.

Figure 4:
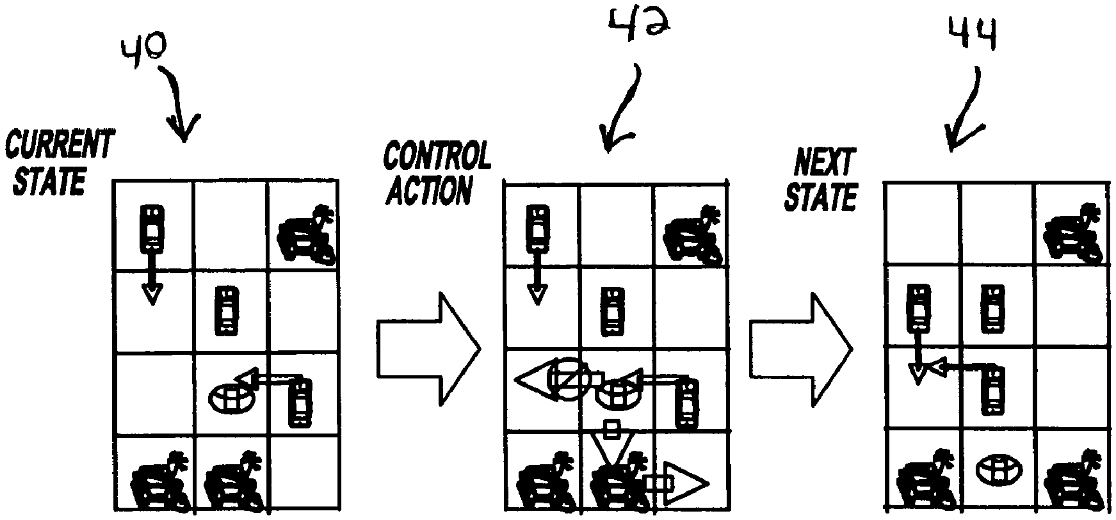
FIG. 4 is a model illustrating various states, according to the present invention.
Figure 5A:
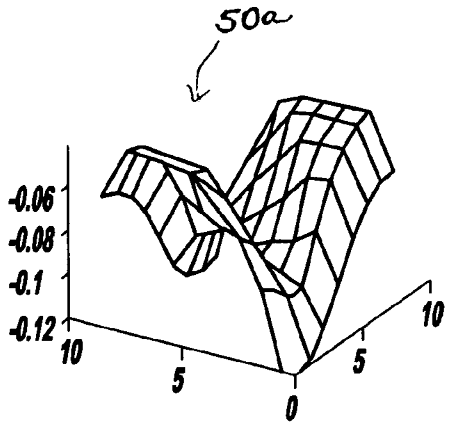
FIGS. 5*a*–5*d* are graphs illustrating an optimal value function for the scaled down problem, and a corresponding vehicle location, using the method of FIG. 2 and the system of FIG. 1, according to the present invention.
Figure 5B:
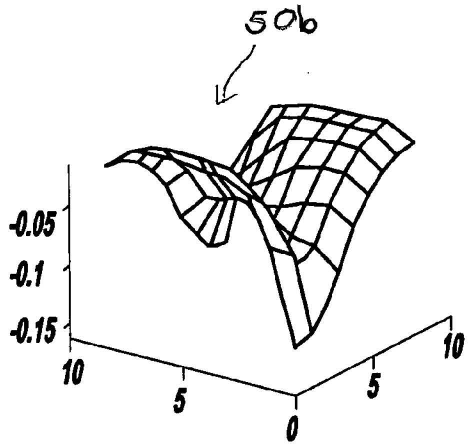
Figure 5C:
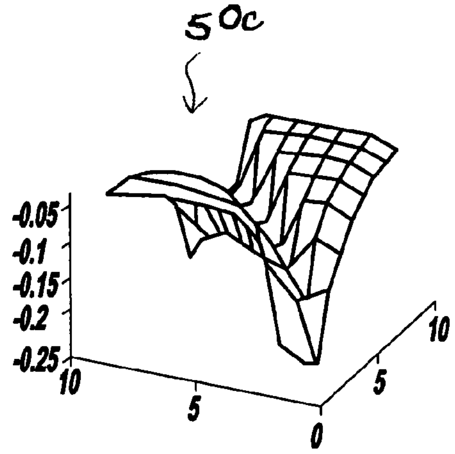
Figure 5D:
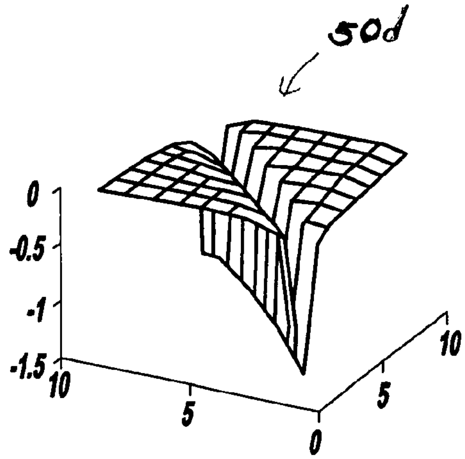

In this example, the MDP domain is modeled by an agent controlling a designated vehicle, as shown at 22 for the first vehicle. The MDP model defines what is happening to the first vehicle 22 (i.e., position, velocity, acceleration, etc.) as a function of the vehicle's control actions (i.e., turn, accelerate, brake, etc.). In addition, a stochastic transition model of the behavior of other vehicles 24 within the environment is available. The transition model is a probabilistic model of what is going to happen to any one of the vehicles 22, 24 in the next time instance, given its current state (position, velocity, etc.). In may be assumed that each uncontrolled vehicle 24 is modeled to strictly adhere to typically driving convention, such as driving on the right hand side of the road, obeying the speed limit and road signals. Within these defined bounds, it may also be assumed that the vehicles 22, 24 will perform functions such as changing lanes, stochastically. Referring to FIG. 4, various states are illustrated, including the current state 40, and action state 42 and a next state 44.

Various strategies are available for modeling the environment, and in particular the behavior of other vehicles.

For example, the MDP may be defined as a 4-tuple (S, A, p, r), where:

S={s} is a finite set of states the agent can be in.

A={a} is a finite set of actions the agent can execute.

p: S×A×S→[0, 1] defines the transition function, which is the probability that the agent goes to state σ if it executes action a in state s is p (σ|s,a). It is usually assumed the transition function is stochastic, meaning that the probability of transitioning out of a state, given an action is 1, i.e., $\Sigma_\sigma p(\sigma|s,a)=1 \forall s \in S, a \in A$.

r: S×A→R defines the reward function. The agent obtains a reward of r(s,a) if it executes action a in state s.

It should be appreciated that a potential optimization criteria to use in an MDP is the total discounted reward optimization criterion. With this criterion, the agent is attempting to maximize the expected value of an infinite sum of exponentially discounted rewards:

$$U(\pi, \alpha) = \mathrm{E}\left[\sum_{t=0}^{\infty} \gamma^t r(t)|\pi, \alpha\right] = \sum_{t=0}^{\infty} \gamma^t \mathrm{E}[r(t)|\pi, \alpha],$$

where γ([0, 1) is the discount factor (a dollar tomorrow is worth a γ part of a dollar received today), r(t) is a random variable that specifies the reward the agent receives at time t, and the expectation of the latter is taken with respect to policy π and initial conditions α.

Therefore, a goal of the agent is to find a policy that maximizes its expected total discounted reward. The policy can be described as a mapping of states to probability distributions over actions: π: S×A→0, 1], where π(s,a) defines the probability that the agent will execute action a when it encounters state s. Various strategies are available to find the optimal policy. A common feature of these strategies is that the optimal value function assigns a value to each state. It can be shown that the optimal value function is the solution of the following system of nonlinear equations:

$$v^{+}(s) = \max_a \left[ r(s, a) + \gamma \sum_{\sigma} p(\sigma|s, a) v^{+}(\sigma) \right]$$

In this example, reward function distinguishes between "bad" states of the environment and the "good" states. As such, a state of the system where there are no collisions between vehicles 22, 24 may be assigned a zero reward, while all states in which a collision has occurred may receive a negative reward, i.e. 0 for no collision and −1 for a collision.

The methodology advances to block 110 and scales down the model of the collision avoidance domain. Various strategies are available for scaling down the collision avoidance domain. For example, the number of cars selected within the domain for consideration may be reduced, i.e. the grid is reduced to a 9×4 grid with only two vehicles in the domain. In another example, the resolution of the grid may be lowered or scaled down.

The methodology advances to block 115 and solves the scaled down collision avoidance domain for an optimal value function and control policy using a classical MDP technique, as is understood in the art, to obtain a solution.

The methodology advances to block 120 and extracts a basis function from the solution. It should be appreciated that the optimal value function is essentially equivalent to an exact solution. In this example, two sets of basis functions are extracted, a primal basis H set and a dual basis Q set that yield good control policies for the collision avoidance domain. FIGS. 5*a*–5*d* illustrate plots of the value function as a function of the position of the controlled car for several relative locations of the uncontrolled car, as shown at 50*a*–50*d*. These graphs suggest that the optimal value of a state depends on a relative distance between objects. The optimal value of the state can be verified by testing the quality of a solution produced by the primal ALP min $\alpha^T Hw|AHw \geqq r$ with the following primal basis function H: for every uncontrolled object, the inverse of the Manhattan distance to the agent is used as a basis function.

Figure 6:
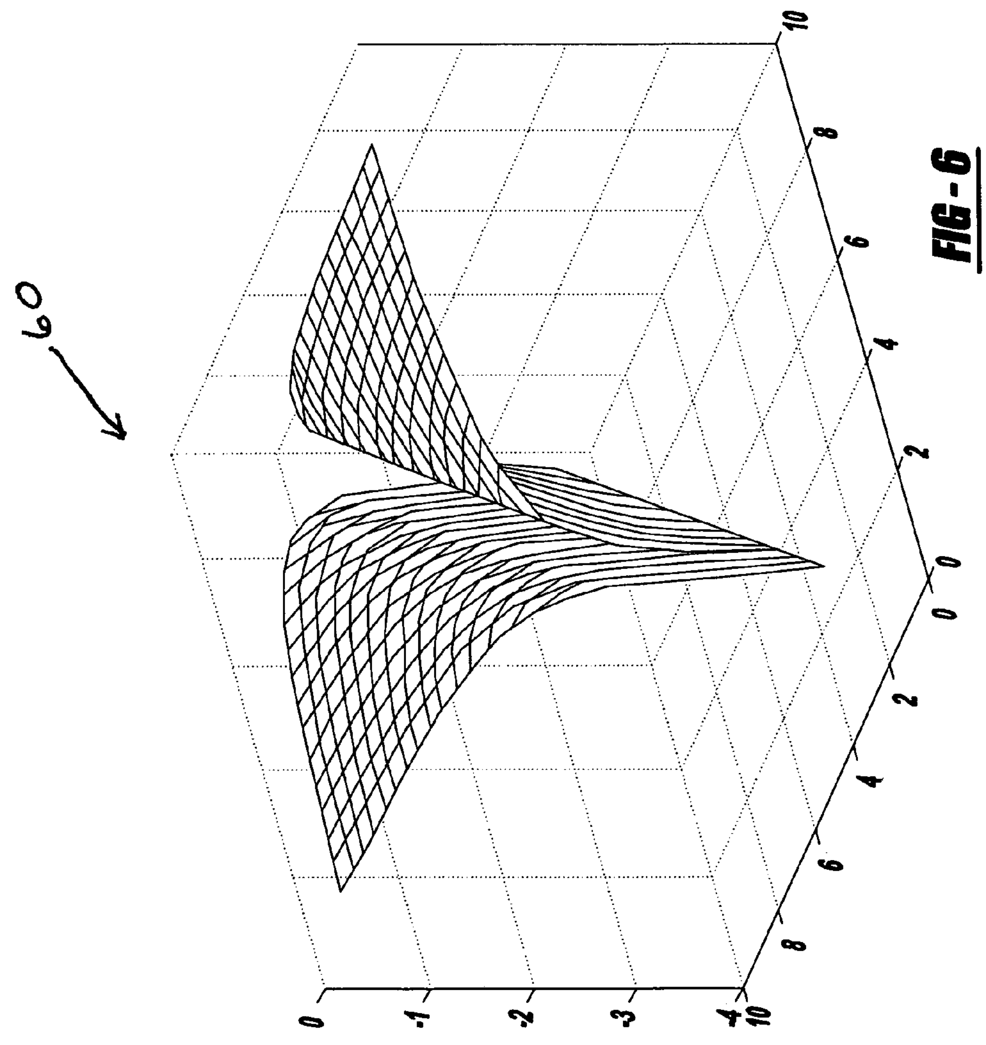
FIG. 6 is a graph of an analytical basis function representing an inverse of a pair-wise distance between cars, using the method of FIG. 2 and the system of FIG. 1, according to the present invention.

This effectively reduces the dimensionality of the objective function of the above equation. Therefore, in this example, a solution may be approximated with high accuracy by using a set of basis functions that are the inverse of the distance between the cars. The compact analytical solution is illustrated in FIG. 6 at 60. Since the domain is highly structured, only a basis function demonstrating pair-wise relationships between objects need be considered.

It should be appreciated that the assumptions made with respect to the primal basis H also apply to the dual basis Q. That is, the flow for the optimal policy increases as a function of the distance between objects, and the optimal actions from a well-structured vector field away from the uncontrolled object. Therefore, the optimal occupation measures represent the dual basis Q set.

The methodology advances to block 125 and scales up the basis function to represent a larger domain that is more similar to the original domain. It should be appreciated that the properties of the basis functions are maintained in the scaled basis function. In scaling up the basis functions, a set of smaller MDPs with pairs of objects are constructed, and the optimal value function is used as the primal basis H and the optimal occupation measure is the dual basis Q.

Figure 7:
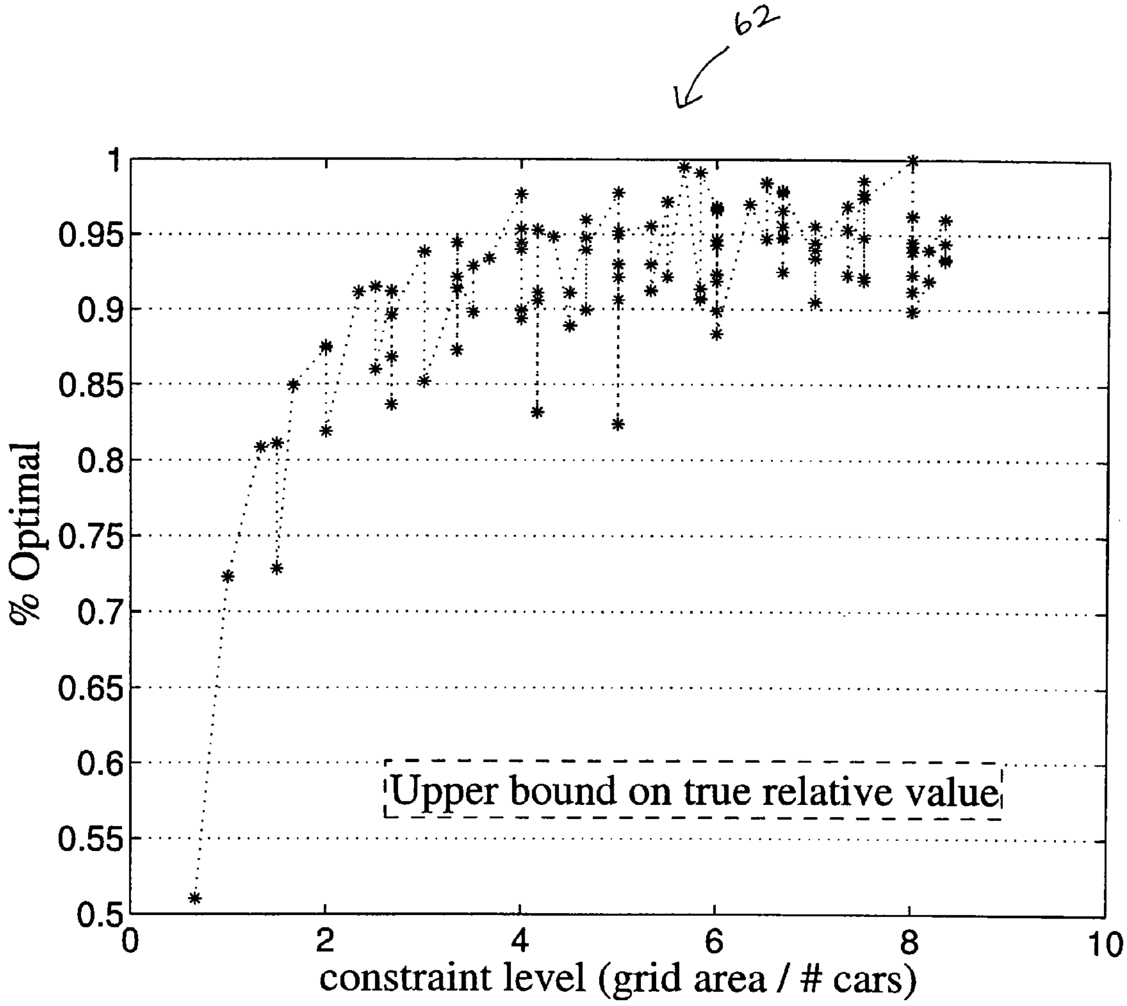
FIG. 7 is a quality plot for determining an upper bound of a pair-wise distance between cars, according to the present invention.

The methodology advances to block 130 and solves the rescaled domain using the scaled up basis function for the control policy, in order to obtain an approximate solution. For example, the conventional approximate linear processing (ALP) method previously described may be applied to the rescaled domain to determine a solution. The resulting control policy may be analyzed using a known probabilistic methodology, such as a Monte Carlo simulation of the environment. The results of the empirical evaluation are illustrated in FIG. 6 at 60 and FIG. 7. FIG. 6 illustrates the value of the approximate policies as a function of how highly constrained the problem is, that is, the ratio of the grid area to the number of cars. FIG. 7 is a quality plot illustrating an upper bound of the true relative value, as shown at 62.

The methodology advances to block 135 and the centrally located processor 16 utilizes the information regarding the uncontrolled vehicles 24 in the environment to transmit a message to the user in the controlled vehicle 22 regarding the physical environment. For example, the user may be provided with a message that the uncontrolled vehicle 24 is in its path. The user may also be provided with a message regarding an obstruction, and a suggested driving maneuver to avoid contact (i.e., stalled vehicle obstructing road). It is contemplated that the message can take various forms. For example, the message may be an audio signal such as a voice recording warning of an oncoming collision with another vehicle. Another example of a message is a written message, or related icon, that is displayed on the display screen.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A method of intelligent navigation with collision avoidance for a vehicle, said method comprising the steps of:

determining a geographic location of a first vehicle and a second vehicle within an environment using a navigation system, wherein the first vehicle and second vehicle are each in communication with a global positioning system to determine the geographic location of the first vehicle and second vehicle respectively;

modeling a collision avoidance domain of the environment of the first vehicle as a discrete state space Markov Decision Process using a centrally located processor in communication with the first vehicle;

scaling down the model of the collision avoidance domain;

determining an optimal value function and control policy that solves the scaled down collision avoidance domain, wherein the optimal value function is an approximate summation of a basis function that is dependent on domain variables;

extracting a representative basis function from the optimal value function;

scaling up the extracted basis function to represent the unscaled domain;

determining an approximate solution to the control policy by solving the rescaled domain using the scaled up basis function; and using the solution to determine if the second vehicle may collide with the first vehicle, and transmitting an alert message to the first vehicle, if determined that the second vehicle may collide with the first vehicle.

2. A method as set forth in claim 1 further including the steps of:

sensing a location of the first vehicle using an input means in communication with the navigation system of the first vehicle.

3. A method as set forth in claim 1 wherein the alert message is transmitted via a user notification device.

4. A method as set forth in claim 1 wherein said step of modeling the environment as a Markov Decision Process further includes the steps of:

superimposing a grid on a map of the environment;

identifying a feature using the grid;

controlling the first vehicle using an agent, wherein the agent executes an action that stochastically controls the model of the collision avoidance domain, receives a reward from the environment and establishes a control policy for selecting actions that optimize the reward; and defining a stochastic transition model of a probabilistic behavior of the second vehicle.

5. A method as set forth in claim 4 wherein the reward is positive for no collision between the first vehicle and second vehicle and the reward is negative for a collision between the first vehicle and second vehicle.

6. A method as set forth in claim 1 wherein said step of scaling down the model of the collision avoidance domain further includes the step of reducing the size of the grid.

7. A method as set forth in claim 1 wherein said step of extracting a basis function further includes the steps of extracting a primal basis function and a dual basis function that provide a predetermined control policy for the collision avoidance domain.

8. A method as set forth in claim 7 wherein the optimal value function is an inverse of a relative distance between the first vehicle and the second vehicle.

9. The method as set forth in claim 1 wherein said step of scaling the basis function up further includes the steps of:

modeling a set of smaller Markov Decision Process using pairs of objects.

10. A method of intelligent navigation with collision avoidance for a vehicle, said method comprising the steps of:

sensing a location of a first vehicle using an input means in communication with a navigation system on the first vehicle, wherein the first vehicle navigation system is in communication with a global positioning system;

sensing a location of a second vehicle using an input means in communication with a navigation system on the second vehicle, wherein the second vehicle navigation system is in communication with the global positioning system;

determining a geographic location of the first vehicle and the second vehicle within an environment using the sensed location of the first vehicle and the sensed location of the second vehicle by a centrally located processor in communication with the first vehicle navigation system and second vehicle navigation system;

modeling a collision avoidance domain of the environment of the first vehicle as a discrete state space Markov Decision Process by superimposing a grid on a map of the environment, identifying a feature using the grid, and controlling the first vehicle using an agent, wherein the agent executes an action that stochastically controls the model of the collision avoidance domain, receives a reward from the environment and establishes a control policy for selecting actions that optimize the reward and defines a stochastic transition model of a probabilistic behavior of the second vehicle;

scaling down the model of the collision avoidance domain;

determining an optimal value function and control policy that solves the scaled down collision avoidance domain, wherein the optimal value function is an approximate summation of a basis function that is dependent on domain variables;

extracting a representative basis function from the optimal value function;

scaling up the extracted basis function to represent the unscaled domain;

determining an approximate solution to the control policy by solving the rescaled domain using the scaled up basis function; and using the solution to determine if the second vehicle may collide with the first vehicle, and transmitting an alert message to the first vehicle, if determined that the second vehicle may collide with the first vehicle.

11. A method as set forth in claim 10 wherein the alert message is transmitted via a user notification device.

12. A method as set forth in claim 10 wherein the reward is positive for no collision between the first vehicle and second vehicle and the reward is negative for a collision between the first vehicle and second vehicle.

13. A method as set forth in claim 10 wherein said step of scaling down the model of the collision avoidance domain further includes the step of reducing the size of the grid.

14. A method as set forth in claim 10 wherein said step of extracting a basis function further includes the steps of extracting a primal basis function and a dual basis function that provide a predetermined control policy for the collision avoidance domain.

15. A method as set forth in claim 10 wherein the optimal value is an inverse of a relative distance between the first vehicle and the second vehicle.

16. The method as set forth in claim 10 wherein said step of scaling the basis function up further includes the steps of:

modeling a set of smaller Markov Decision Process using pairs of objects.

17. An intelligent navigation system with collision avoidance for a vehicle comprising:

a global positioning system which includes a global positioning transceiver associated with a first vehicle, a global positioning transceiver associated with a second vehicle, and a global positioning signal transmitter in communication with the first vehicle global positioning transceiver and second vehicle global positioning transceiver;

a navigation means on a first vehicle in communication with the global positioning system;

a centrally located processor in communication with said navigation means on said first vehicle and the navigation means on said second vehicle;

an information database associated with the controller for identifying a location of said first vehicle;

an input means on the first vehicle for sensing a location of the first vehicle, and said input means is in communication with said first vehicle navigation means;

an alert means for providing an alert message to an operator of the first vehicle regarding a collision with the second vehicle, wherein the alert means is operatively in communication with said centrally located processor; and wherein the centrally located processor hosts an intelligent navigation computer software program that uses the geographic location of the first vehicle and the geographic location of the second vehicle within the environment to model a collision avoidance domain of the environment of the first vehicle as a discrete state space Markov Decision Process, by scaling down the model of the collision avoidance domain, determining an optimal value function and control policy that solves the scaled down collision avoidance domain, wherein the optimal value function is an approximate summation of a basis function that is dependent on domain variables, extracts a representative basis function from the optimal value function, scales up the extracted basis function to represent the unscaled domain, determines an approximate solution to the control policy by solving the rescaled domain using the scaled up basis function, and uses the solution to determine if the second vehicle will collide with the first vehicle, and provides an alert message to the first vehicle, if determined that the second vehicle may collide with the first vehicle.

* * * * *

UNITED STATES PATENT AND TRADEMARK OFFICE

CERTIFICATE OF CORRECTION

PATENT NO. : 7,167,799 B1 — Page 1 of 1
APPLICATION NO. : 11/387414
DATED : January 23, 2007
INVENTOR(S) : Kenneth P. Laberteaux et al.

It is certified that error appears in the above-identified patent and that said Letters Patent is hereby corrected as shown below:

Column 5, line 49, replace “In may” with --It may--

Signed and Sealed this

Tenth Day of April, 2007

JON W. DUDAS
*Director of the United States Patent and Trademark Office*